(12) United States Patent
Whyte et al.

(10) Patent No.: US 11,792,645 B2
(45) Date of Patent: Oct. 17, 2023

(54) AUTHENTICATING PLAINTEXT AND CIPHERTEXT IN A VEHICLE-TO-EVERYTHING (V2X) MESSAGE

(71) Applicant: QUALCOMM Incorporated, San Diego, CA (US)

(72) Inventors: William Whyte, Natick, MA (US); Sean Vincent Maschue, Encinitas, CA (US); Drew Foster Van Duren, Templeton, CA (US); Virendra Kumar, Sudbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/497,120

(22) Filed: Oct. 8, 2021

(65) Prior Publication Data

US 2022/0295274 A1 Sep. 15, 2022

Related U.S. Application Data

(60) Provisional application No. 63/180,450, filed on Apr. 27, 2021, provisional application No. 63/158,955, filed on Mar. 10, 2021.

(51) Int. Cl.
*H04W 12/041* (2021.01)
*H04W 12/0471* (2021.01)
(Continued)

(52) U.S. Cl.
CPC ......... *H04W 12/0471* (2021.01); *H04W 4/12* (2013.01); *H04W 4/40* (2018.02);
(Continued)

(58) Field of Classification Search
CPC .................. H04L 9/3242; H04L 9/50
(Continued)

(56) References Cited

U.S. PATENT DOCUMENTS

| 2008/0081646 A1* | 4/2008 | Morin ..................... H04W 4/90 455/466 |
| 2009/0041252 A1* | 2/2009 | Hanna ..................... H04L 63/12 380/278 |

(Continued)

FOREIGN PATENT DOCUMENTS

| CN | 111865919 A | 10/2020 |
| CN | 112379898 A | 2/2021 |
| WO | 2020036239 A1 | 2/2020 |

OTHER PUBLICATIONS

Don Davis Trust, et al., "Defective Sign & Encrypt in S/MIME, PKCS // 7, MOSS, PEM, PGP, and XML", USENIX, USENIX, the Advanced Computing Systems Association, Jan. 4, 2002 (Jan. 4, 2002), XP061012726, 14 pages.

(Continued)

*Primary Examiner* — Kiet M Doan
(74) *Attorney, Agent, or Firm* — The Marbury Law Group

(57) ABSTRACT

Methods and devices and systems for implementing the methods for authenticating plaintext and ciphertext in a vehicle-to-everything (V2X) message include generating ciphertext from a plaintext message to be transmitted in a V2X message, generating a hash of the ciphertext and a hash of the plaintext message, generating a digital signature of a concatenation of the hash of the ciphertext and the hash of the plaintext message, and sending to a network node a V2X message that includes the ciphertext, the hash of the plaintext message, and the digital signature. The hash of the plaintext message, and the digital signature may be config- (Continued)

ured to enable the network node to verify that the V2X endpoint node signed the concatenation.

26 Claims, 11 Drawing Sheets

(51) Int. Cl.
*H04W 12/06* (2021.01)
*H04W 4/40* (2018.01)
*H04W 4/12* (2009.01)
*H04L 9/32* (2006.01)

(52) U.S. Cl.
CPC ......... *H04W 12/041* (2021.01); *H04W 12/06* (2013.01); *H04L 9/3236* (2013.01); *H04L 9/3247* (2013.01)

(58) Field of Classification Search
USPC ...................................... 380/42, 268, 37, 30
See application file for complete search history.

(56) References Cited

U.S. PATENT DOCUMENTS

| | | | |
|---|---|---|---|
| 2010/0122088 A1* | 5/2010 | Oxford | H04L 63/0478 380/278 |
| 2010/0161984 A1 | 6/2010 | Pauker et al. | |
| 2016/0021109 A1 | 1/2016 | Jueneman et al. | |
| 2016/0219029 A1 | 7/2016 | Oshida | |
| 2016/0373418 A1* | 12/2016 | Stahl | G06F 21/44 |
| 2018/0134253 A1 | 5/2018 | Zielinski et al. | |
| 2019/0238322 A1 | 8/2019 | Wang et al. | |
| 2020/0259651 A1* | 8/2020 | Mohassel | H04L 9/0869 |
| 2020/0322126 A1* | 10/2020 | Driscoll | H04L 1/0041 |
| 2022/0116820 A1* | 4/2022 | Avedisov | G08G 1/0141 |

OTHER PUBLICATIONS

International Search Report and Written Opinion—PCT/US2022/011077—ISA/EPO—dated Apr. 25, 2022; 15 pages.

\* cited by examiner

Fig. 2. Protocol stack and related core standards for C-ITS in Europe

350

- SignedDecryptableData ::= Ieee1609Dot2Data
  -- signed data with payload SignedDecryptableDataPayload

- SignedDecryptableDataPayload ::= SEQUENCE {
  hOP    HashOrPlaintext,
  hOC    HashOrCiphertext    ← 352
  }

- HashOrPlaintext ::= CHOICE {    354
  hash           HashedId32,
  plaintext   Ieee1609Dot2Data -- of type unsecured
  }

- HashOrCiphertext ::= CHOICE {    356
  hash           HashedId32,
  ciphertext  Ieee1609Dot2Data -- of type encrypted
  }

FIG. 3B

AUTHENTICATING PLAINTEXT AND CIPHERTEXT IN A VEHICLE-TO-EVERYTHING (V2X) MESSAGE

RELATED APPLICATIONS

This application claims the benefit of priority to U.S. Provisional Patent Application No. 63/158,955 entitled "Authenticating Plaintext And Ciphertext In A Vehicle-To-Everything (V2X) Message" filed Mar. 10, 2021 and to U.S. Provisional Patent Application No. 63/180,450 entitled "Authenticating Plaintext And Ciphertext In A Vehicle-To-Everything (V2X) Message With Enhanced Security" filed Apr. 27, 2021, the entire contents of both of which are hereby incorporated by reference for all purposes.

BACKGROUND

Multiple regions of the world are developing standards for vehicle-based communication systems and functionality. Standards developed in Institute of Electrical and Electronics Engineers (IEEE) and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), and so forth.

An element of V2X systems is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles occurs in onboard equipment that provide the vehicle-to-everything (V2X) functionality (referred to herein as "V2X onboard equipment").

SUMMARY

Various aspects include methods and systems performed by endpoint nodes for authenticating plaintext and ciphertext in a message. Some aspects may include generating ciphertext from a plaintext message to be transmitted in a message, generating a hash of the ciphertext and a hash of the plaintext message, generating a digital signature of a concatenation of the hash of the ciphertext and the hash of the plaintext message, and sending to a network node a message that includes the ciphertext, the hash of the plaintext message, and the digital signature. In some aspects, the ciphertext, the hash of the plaintext message, and the digital signature may be configured to enable the network node to verify that the endpoint node signed the signed concatenation. In some aspects, the endpoint node may include a vehicle-to-everything (V2X) endpoint node, and the message may include a V2X message.

In some aspects, the message may be configured for transmission over a limited bandwidth wireless communication link. In some aspects, the message may be configured as one of a tolling message, a parking access message, a road condition message, a geonetworking message, or an emergency responder message. In some aspects, the plaintext message may include one of tolling information, parking access information, road condition information, geonetworking information, and emergency responder information. In some aspects, the concatenation of the hash of the ciphertext and the hash of the plaintext message may include a data structure that includes an identification of the ciphertext or the hash of the ciphertext and an identification of the plaintext message or the hash of the plaintext message.

Various aspects include methods and systems performed by a processor of a network node for processing a message. Some aspects may include receiving from an endpoint node a message including ciphertext, a hash of a plaintext message, and a digital signature of a concatenation of a hash of the ciphertext and the hash of the plaintext message, determining whether the endpoint node signed the concatenation of the hash of the ciphertext and the hash of the plaintext message, and sending to an encryption key device the ciphertext, the hash of the plaintext message, and the digital signature of the concatenation of the hash of the ciphertext and the hash of the plaintext message in response to determining that the endpoint node signed the concatenation of the hash of the ciphertext and the hash of the plaintext message.

In some aspects, the message may include a V2X message and the endpoint node may include a V2X endpoint node. In some aspects, determining whether the endpoint node signed the concatenation of the hash of the ciphertext and the hash of the plaintext message may include generating a hash of the ciphertext, concatenating the hash of the plaintext message and the generated hash of the ciphertext, and providing the concatenation of the hash of the plaintext message and the generated hash of the ciphertext as an input to verify the digital signature using a public key of the endpoint node. In some aspects, generating the hash of the ciphertext may include generating the hash of the ciphertext using a hash algorithm known to be used by an authentic endpoint node. In some aspects, the message may be configured for transmission over a limited bandwidth wireless communication link. In some aspects, the message may be configured as one of a tolling message, a parking access message, a road condition message, a geonetworking message, or an emergency responder message.

In some aspects, the concatenation of the hash of the ciphertext and the hash of the plaintext message may include a data structure that includes an identification of the hash of the ciphertext and an identification of the hash of the plaintext message. In some aspects, sending to an encryption key device the ciphertext, the hash of the plaintext message, and the digital signature of the concatenation of the hash of the ciphertext and the hash of the plaintext message may include sending to an encryption key server the ciphertext, the hash of the plaintext message, and the digital signature of the concatenation of the hash of the ciphertext and the hash of the plaintext message. In some aspects, sending to an encryption key device the ciphertext, the hash of the plaintext message, and the digital signature of the concatenation of the hash of the ciphertext and the hash of the plaintext message may include sending to an encryption key module the ciphertext, the hash of the plaintext message, and the digital signature of the concatenation of the hash of the ciphertext and the hash of the plaintext message.

Various aspects include methods and systems performed by a processor of a computing device for authenticating plaintext and ciphertext in a message. Some aspects may include receiving from an encryption key device a plaintext message originated by an endpoint node, a hash of ciphertext of the plaintext message, and a digital signature of a concatenation of the hash of the ciphertext and a hash of the plaintext message, determining whether the endpoint node signed the concatenation of the hash of the ciphertext and a hash of the plaintext message, and performing a data transaction for the endpoint node in response to determining that the endpoint node signed the concatenation of the ciphertext and the plaintext message.

In some aspects, the message may include a V2X message and the endpoint node may include a V2X endpoint node. In some aspects, determining whether the endpoint node signed the concatenation of the hash of the ciphertext and a hash of the plaintext message may include generating a hash of the plaintext message, concatenating the generated hash of the plaintext message and the hash of the ciphertext, and providing the concatenation of the generated hash of the plaintext message and the hash of the ciphertext as an input to verify the digital signature using a public key of the endpoint node.

In some aspects, the plaintext message may include one of tolling information, parking access information, road condition information, geonetworking information, and emergency responder information. In some aspects, the concatenation of the hash of the ciphertext and the hash of the plaintext message may include a data structure that includes an identification of the ciphertext or the hash of the ciphertext and an identification of the plaintext message or the hash of the plaintext message. In some aspects, receiving from an encryption key device a plaintext message originated by an endpoint node, a hash of ciphertext of the plaintext message, and a digital signature of a concatenation of the hash of the ciphertext and a hash of the plaintext message may include receiving from an encryption key server the plaintext message originated by the endpoint node, a hash of ciphertext of the plaintext message, and a digital signature of a concatenation of the hash of the ciphertext and a hash of the plaintext message. In some aspects, receiving from an encryption key device a plaintext message originated by an endpoint node, a hash of ciphertext of the plaintext message, and a digital signature of a concatenation of the hash of the ciphertext and a hash of the plaintext message may include receiving from an encryption key module the plaintext message originated by the endpoint node, a hash of ciphertext of the plaintext message, and a digital signature of a concatenation of the hash of the ciphertext and a hash of the plaintext message.

Various aspects include a system for authenticating plaintext and ciphertext in a message, including an endpoint node including a processor configured with processor-executable instructions to generate ciphertext from a plaintext message to be transmitted in a message, generate a hash of the ciphertext and a hash of the plaintext message, generate a digital signature of a concatenation of the hash of the ciphertext and the hash of the plaintext message, and send a message including the ciphertext, the hash of the plaintext message, and the digital signature.

The system also may include a network node including a processor configured with processor-executable instructions to receive from the endpoint node the message including the ciphertext, the hash of a plaintext message, and the digital signature, determine whether the endpoint node signed the concatenation of the hash of the ciphertext and the hash of the plaintext message, and send to an encryption key device the ciphertext, the hash of the plaintext message, and the digital signature in response to determining that the endpoint node signed the concatenation of the hash of the ciphertext and the hash of the plaintext message. The system also may include a network processing device including a processor configured with processor-executable instructions to receive from an encryption key device the plaintext message originated by the endpoint node, a hash of ciphertext of the plaintext message, and a digital signature of a concatenation of the hash of the ciphertext and a hash of the plaintext message, determine whether the endpoint node signed the concatenation of the hash of the ciphertext and the hash of the plaintext message, and perform a data transaction for the endpoint node in response to determining that the endpoint node signed the concatenation of the ciphertext and the plaintext message.

Further aspects include an endpoint node, a network node, and/or a computing device including a memory and a processor configured to perform operations of any of the methods summarized above. Further aspects may include an endpoint node, a network node, and/or a computing device having various means for performing functions corresponding to any of the methods summarized above. Further aspects may include a non-transitory processor-readable storage medium having stored thereon processor-executable instructions configured to cause a processor of an endpoint node, a network node, and/or a computing device to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 3B illustrates an example data structure suitable for implementing various embodiments.

DETAILED DESCRIPTION

Figure 1A:
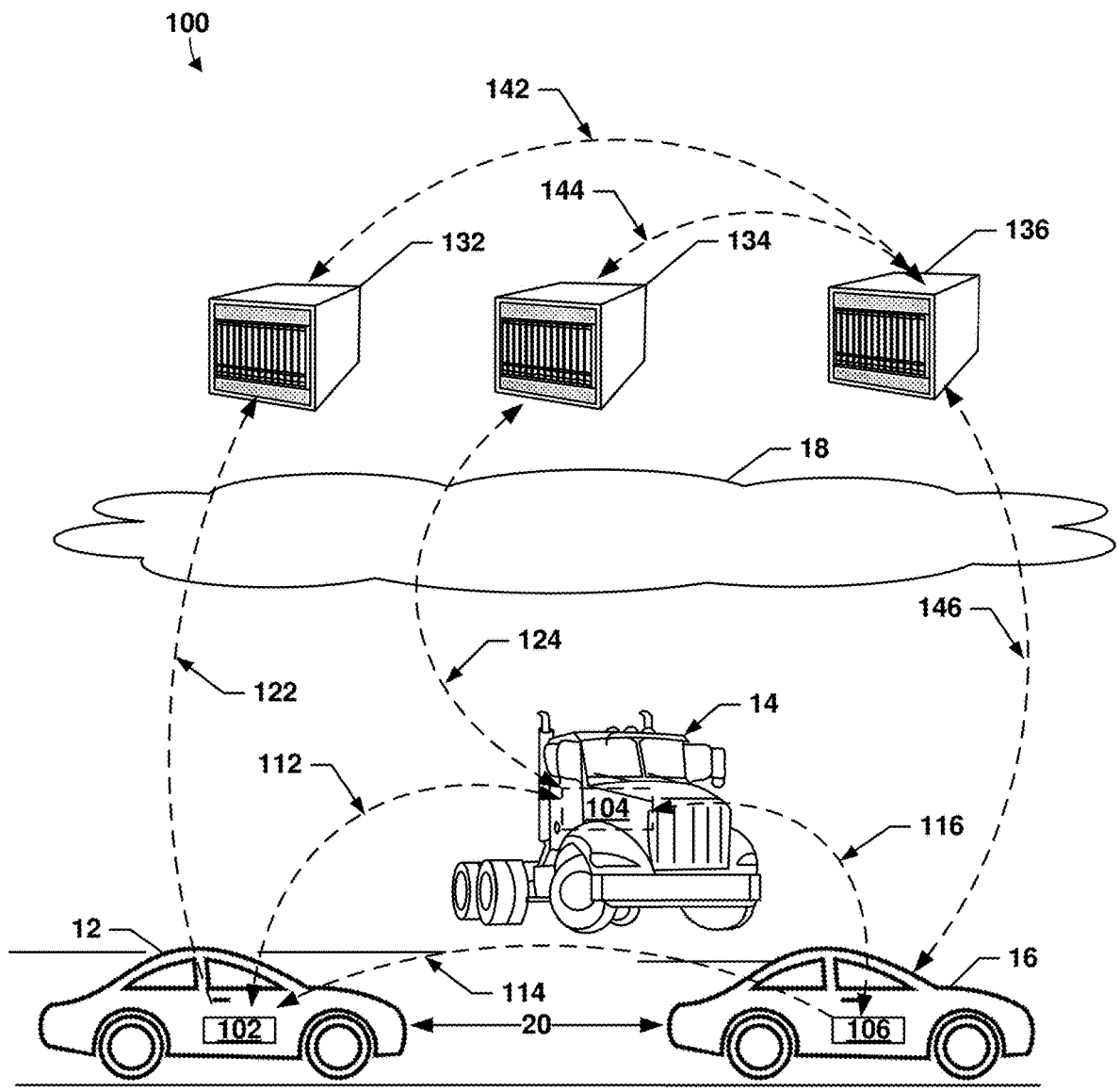
FIG. 1A is a system block diagram illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Wireless communication links typically used for V2X communications are bandwidth constrained. In some situations, a V2X endpoint node (e.g., a vehicle) may send a V2X message with encrypted plaintext content. The V2X message may be received by an intermediate network node (e.g., a roadside unit (RSU), a gantry-deployed unit, and the like), which verifies that over-the-air transmission of the message has not introduced errors into the message. The intermediate network node may then pass the message on to a processing network node, which decrypts the message content and performs an operation based on the message content. While two digital signatures may be generated for the V2X message, one for the plaintext and one for the encrypted plaintext (i.e., ciphertext), doing so increases the bandwidth overhead incurred by the V2X message, as well as the computational overhead of generating two signatures for the V2X message.

Various embodiments include methods and mechanisms for authenticating plaintext and ciphertext in a vehicle-to-everything (V2X) message in an intelligent transportation system (ITS). Various embodiments enable various network elements, such as a V2X endpoint node (which may be a mobile computing device, such as V2X onboard equipment of a vehicle, a mobile phone, a laptop, tablet, or another suitable computing device), an intermediate node (such as another vehicle or mobile computing device, a roadside unit (RSU), a gantry unit (such as a tolling gantry unit)), an a network processing device (such as a server, as may be used for a data transaction such as toll or parking payment processing, monitoring road conditions, screening of commercial vehicles, and other suitable applications) to authenticate plaintext and ciphertext in a V2X message. Authentication methods supported by various embodiments are particularly useful for V2X bandwidth-constrained messages.

V2X processing and communication systems may be implemented in a variety of vehicles, such as automobiles, trucks, buses, trailers, autonomous vehicles, robotic systems and the like. Also, an ITS or other V2X system include a number of fixed equipment installations, such as roadside units, access nodes, and wireless relay nodes. Further, various embodiments may be useful in systems that are unrelated to ITS functionality but make use of V2X capabilities, such as pay-to-park garages, wireless payment systems for a variety of commercial applications, emergency medical services, etc. Various embodiments may be implemented in any of a variety of V2X-equipped vehicles, fixed installations, and other devices using V2X communication infrastructure. To encompass all implementations of various embodiments, the term "V2X endpoint node" is used in this description and the claims to refer generally to a mobile, semi-mobile, or fixed system that implements V2X communication functionality. A non-limiting example of a V2X endpoint node that is used for describing is a vehicle, such as an automobile paying a toll while traveling on a toll road, but references to this and other examples are not intended to limit the scope of claims reciting a V2X endpoint node. Some implementations may be used in any communication system in which authenticated encrypted messages may be transmitted via a communication medium in which at least some portion of the communication links (e.g., segments, hops, etc.) have constrained communication resources, such as limited bandwidth, channel capacity, and/or the like.

Verification of the integrity, authenticity, and in some cases confidentiality, of V2X messages is useful to enable the performance of various functions for autonomous and semi-autonomous vehicles and supporting various services in an ITS. In various embodiments, a V2X endpoint node (e.g., a V2X-equipped vehicle) may be requested to send information to a network processing device via an intermediate network node (e.g., a roadside unit or other ITS node). An encryption key device may generate an encryption key and send the encryption key to an intermediate network node. In some embodiments, the encryption key device may be a separate device, such as an encryption key server. In some embodiments, the encryption key device may be a module, unit, or function of the intermediate network node (or of the network processing device). The intermediate network node may send the encryption key to the V2X endpoint node with a request that the V2X provide certain information. The V2X endpoint node may generate a responsive message, generate a digital signature of the message, encrypt the message, and generate a digital signature of the encrypted message. The V2X endpoint node may send the encrypted message and the digital signature to the intermediate network node. The intermediate network node may verify the digital signature of the encrypted message, which verifies the integrity of the messages sent from the V2X endpoint node. The intermediate network node may pass the encrypted message to the encryption key device, which decrypts the message and sends the decrypted message and the digital signature of the message to the network processing device. The network processing device may verify the digital signature of the message, and may perform some action or operation involving the message from the V2X endpoint node.

An example application of various embodiments involves performing a fee collection or toll collection operation for a V2X endpoint node, such as a V2X-equipped vehicle traveling on a toll road or entering a pay-to-park garage. A tolling gantry device (or other suitable device) may detect the V2X endpoint node and send a message to the V2X mode requesting information for the fee collection operation (e.g., a tolling advertisement message (TAM)). The V2X endpoint node may respond with a tolling upload message (TUM) that includes a responsive message, a digital signature of the message, an encrypted version of the message, and a digital signature of the encrypted message. The tolling gantry device may use the digital signature of the encrypted message to verify that over-the-air transmission of the TUM has not introduced errors in the message. A network node of a toll (fee) service provider may use the digital signature of the message (after decryption) to perform relevant financial transaction operations for the fee collection (provided that the digital signature of the message is verified).

As noted above, two digital signatures are generated, one for the message (i.e., plaintext) and one for an encrypted version of the message (i.e., ciphertext). However, generating and sending two distinct digital signatures would increase the radio frequency (RF) overhead required to transport this information via wireless communications. For example, in some communication protocol implementations, each additional signature may add 100 bytes or more to a single message. When numerous V2X endpoint nodes, intermediate nodes, and network nodes generate, encrypt, decrypt, and process such messages, the additional overhead can have a significant detrimental impact on communication system resources, especially on communication resources in a bandwidth-constrained system such as a V2X communication system.

Various embodiments include methods, V2X processing devices, and systems configured to perform the methods for authenticating plaintext and ciphertext in a V2X message in a manner that improves the efficiency and reduces the processing and communication link overhead required to handle such V2X messages. In some embodiments, a V2X endpoint node (e.g., a V2X processing device in V2X onboard equipment of a vehicle) may generate ciphertext from a plaintext message to be transmitted in a V2X message, generate a hash of the ciphertext and a hash of the plaintext message, generate a digital signature of a concatenation of the hash of the ciphertext and the hash of the plaintext message, and send to a network node a V2X message that includes the ciphertext, the hash of the plaintext message, and the digital signature. In some embodiments, the ciphertext, the hash of the plaintext message, and the digital signature may be configured to enable the network node to verify that the wireless device signed the signed concatenation of the hash of the ciphertext and the hash of the plaintext message.

In various embodiments, the hash of the ciphertext and the hash of the plaintext message may be concatenated in any order. In some embodiments, the hash of the ciphertext and/or the hash of the plaintext message may be included in a data structure (such as may be described by a data structure description language such as Abstract Syntax Notation One (ASN.1) or another suitable data structure description language) that defines the location in the message (e.g., a defined byte range) of the hash of the ciphertext and the hash of the plaintext message. In some embodiments, the hash of the ciphertext and/or the hash of the plaintext message may include an indication (e.g., a starting byte value or a field length value) that identifies locations of or a boundary between the ciphertext and/or the hash of the ciphertext and an identification of the plaintext message and/or the hash of the plaintext message.

In some embodiments, the V2X message is configured for transmission over a limited bandwidth wireless communication link, such as a bandwidth constrained V2X wireless communication link. In some embodiments, the V2X message may be configured according to one or more functions or systems. In some embodiments, the plaintext message may include sensitive financial information (e.g., account number, credit card number, etc.) about or associated with the V2X endpoint node that may enable a toll collection or fee collection operation related to the V2X endpoint node. For example, the V2X message may be configured as a tolling message (e.g., for a fee collection or toll collection system), a parking access message (e.g., for a parking payment system), a road condition message (e.g., a message to the another vehicle, to an RSU, or to a network node about traffic, observed vehicle behavior, road damage, a dangerous road condition such as ice or flooding, etc.), a geonetworking message (e.g., for use in a geonetworking message or messaging system), an emergency responder message (e.g., police, fire, emergency medical technician, or other emergency responder system), or another suitable message or messaging system.

In some embodiments, the plaintext message may include non-financial sensitive information, such as personal identity, medical information, classified or proprietary information, for which protection and authentication is appropriate. In some embodiments, the plaintext message may include parking access information, such as a parking location, timer period, and/or a parking fee. In some embodiments, the plaintext message may include road condition information. In some embodiments, the plaintext message may include geonetworking information. In some embodiments, the plaintext message may include emergency responder information, such as information about a dangerous condition, event, accident, and the like, identity information about suspects or victims, medical information, personal identifiable information (PII), and the like. In some implementations, the content of the plaintext message may include information of a confidential or sensitive nature, or information that must be treated confidentially by law or regulation (e.g., financial accounts information, medical information, and so forth).

In some embodiments, a network node (e.g., an intermediate network node, such as a vehicle, an RSU, a gantry unit, an edge computing device, and the like) may receive from a V2X endpoint node a V2X message that includes ciphertext, a hash of a plaintext message, and a digital signature of a concatenation of a hash of the ciphertext and the hash of the plaintext message. The network node may determine whether the V2X endpoint node signed the concatenation of the hash of the ciphertext and the hash of the plaintext message by generating a hash of the ciphertext, using the generated hash of the ciphertext to construct a concatenation of the received hash of the plaintext message and the generated hash of the ciphertext, and using the concatenation of the received hash of the plaintext message and the generated hash of the ciphertext as an input to verify the digital signature using a public key of the V2X endpoint node. In response to determining that the V2X endpoint node signed the concatenation of the hash of the ciphertext and the hash of the plaintext message, the network node may send to an encryption key device the ciphertext, the hash of the plaintext message, and the digital signature of the concatenation of the hash of the ciphertext and the hash of the plaintext message.

In some embodiments, a computing device (e.g., a payment processing server, a computing device configured to process road condition information, a computing device configured to process emergency responder messages and information, or another suitable computing device) may receive from an encryption key device a plaintext message originated by a V2X endpoint node, a hash of ciphertext of the plaintext message, and a digital signature of a concatenation of the hash of the ciphertext and a hash of the plaintext message. The computing device may determine whether the V2X endpoint node signed the concatenation of the hash of the ciphertext and a hash of the plaintext message by generating a hash of the plaintext message, using the hash of the plaintext message to construct a concatenation of the generated hash of the plaintext message and the received hash of the ciphertext, and using the concatenation of the generated hash of the plaintext message and the received hash of the ciphertext as an input to verify the digital signature using a public key of the V2X endpoint node. The computing device may perform a data transaction for the V2X endpoint node in response to determining that the V2X endpoint node signed the concatenation of the ciphertext and the plaintext message.

Various embodiments include methods, V2X processing devices, and systems configured to perform the methods for authenticating plaintext and ciphertext in a V2X message in a manner that improves processing and communication link efficiency, and reduces the processing and communication link overhead required to handle such V2X messages.

For ease of reference, some of the embodiments are described in this application with reference to a vehicle using V2X systems and protocols. However, it should be understood that various embodiments encompass any or all of the V2X or vehicle-based communication standards, messages, protocols, and/or technologies. As such, nothing in the application should be construed to limit the claims to a particular system (e.g., V2X) or message or messaging protocol (e.g., Basic Safety Messages (BSMs) unless expressly recited as such in the claims. In addition, the embodiments described herein may refer to a V2X processing system in a vehicle. Other embodiments are contemplated in which the V2X processing system may operate in or be included in mobile devices, mobile computers, RSUs, and other devices that are equipped to monitor road and vehicle conditions and to participate in V2X communications.

Figure 1B:
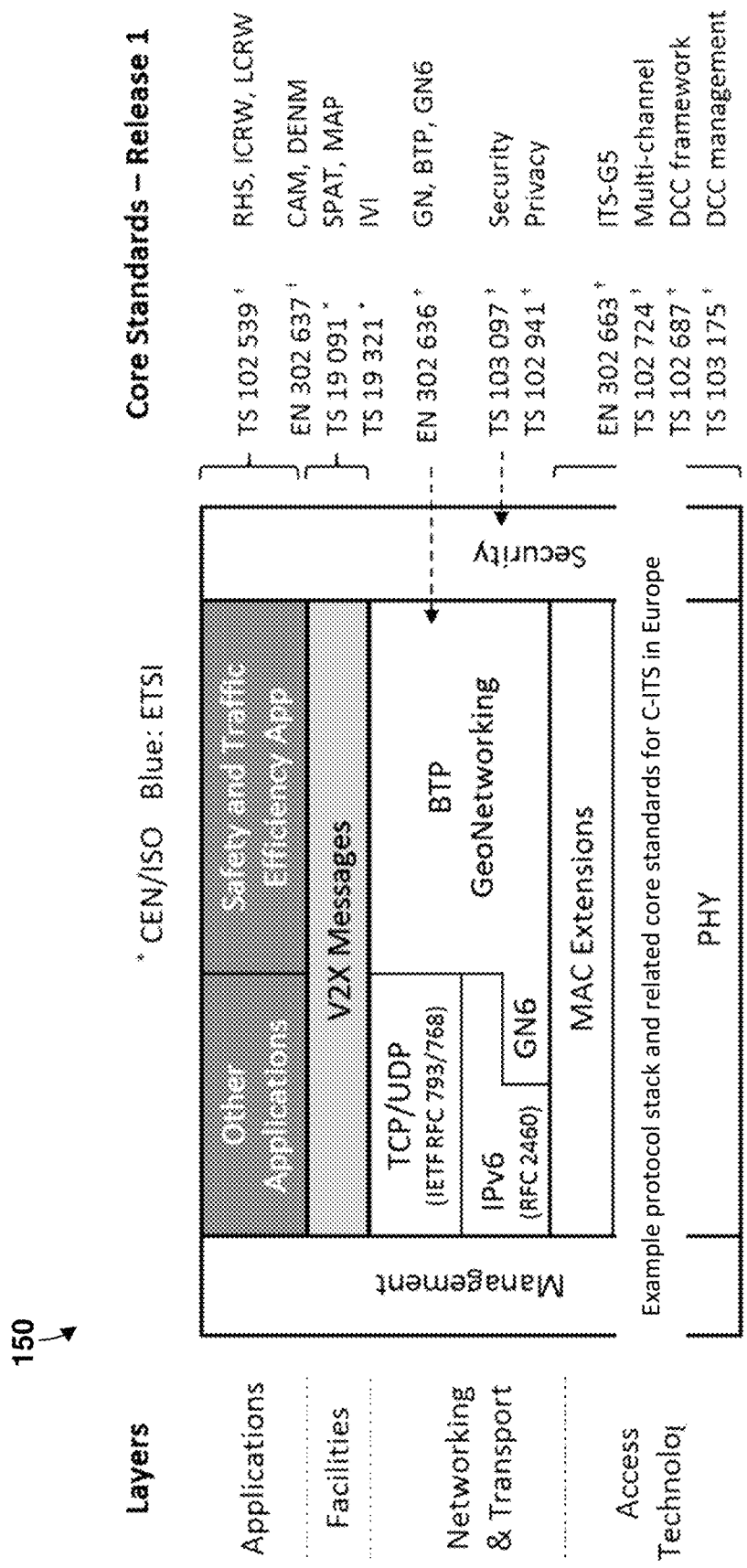
FIG. 1B is a conceptual diagram illustrating an example V2X communication protocol stack suitable for implementing various embodiments.

FIG. 1A is a system block diagram illustrating an example V2X system 100 suitable for implementing various embodiments. FIG. 1B is a conceptual diagram illustrating an example V2X communication protocol stack 150 suitable for implementing various embodiments. With reference to FIGS. 1A and 1B, a vehicle 12, 14, 16 may include V2X onboard equipment 102, 104, 106, respectively, that may be configured to send and receive V2X messages, including periodically broadcasting Basic Safety Messages 112, 114, 116 for receipt and processing by other vehicles' onboard equipment (e.g., 102, 104, 106).

By sharing the vehicle location, speed, direction, behavior such as braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 112, 116 from the two vehicles 12, 16, and thus be informed that the truck vehicle 14 should stop at an intersection to avoid a collision. Further, each of the vehicle V2X on-board equipment 102, 104, 106 may communicate with one another using any of a variety close proximity communication protocols.

In addition, the vehicles may be able to transmit data and information regarding Basic Safety Messages and other V2X communications to a variety of network elements 132, 134, 136 via communication links 122, 124, 146 through a communication network 18 (e.g., V2X, cellular, WiFi, etc.) For example, network element 132 may be incorporate into, or may be in communication with, an RSU, a gantry unit, and/or the like. The network element 134, 136 may be configured to perform a function or service related to a vehicle 12, 14, 16, such as payment processing, road condition monitoring, emergency provider message handling, and the like. The network element 134, 136 may be configured to communicate with one another through wired or wireless networks 142, 144 to exchanging information associated with payment processing, road condition monitoring, emergency provider message handling, and similar services.

Figure 2:
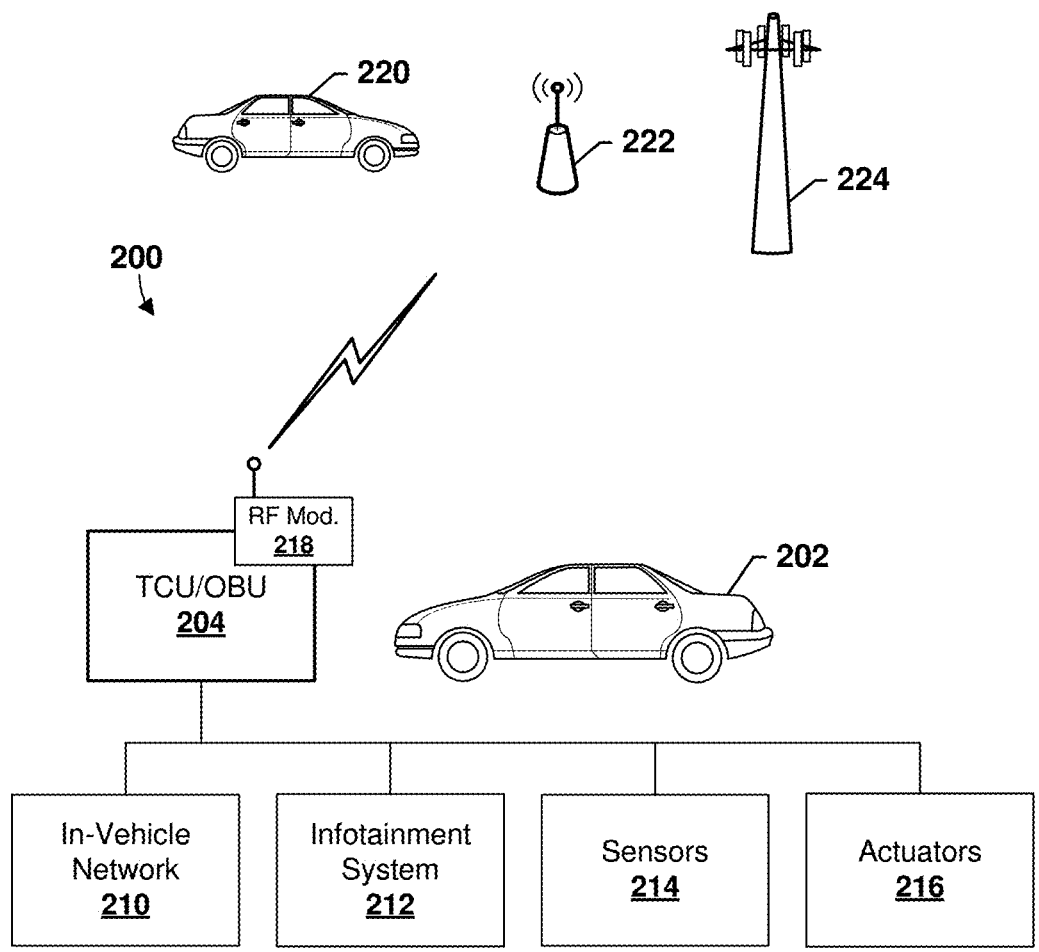
FIG. 2 is a component diagram of an example vehicle system suitable for implementing various embodiments.

FIG. 2 is a component diagram of an example vehicle system 200 suitable for implementing various embodiments. With reference to FIGS. 1A-2, the system 200 may include a vehicle 202 that includes a V2X processing device 204 (for example, a telematics control unit or on-board unit (TCU/OBU). The V2X processing device 202 may communicate with various systems and devices, such as an in-vehicle network 210, an infotainment system 212, various sensors 214, various actuators 216, and a radio frequency (RF) module 218. The V2X processing device 202 also may communicate with various other vehicles 220, roadside units 222, base stations 224, and other external devices. The TCU/OBU 204 may be configured to perform operations for authenticating plaintext and ciphertext as further described below.

The V2X processing device 204 may include a V2X antenna (e.g., an RF module 218), and may be configured to communicate with one or more ITS participants (e.g., stations) such as another vehicle 220, a roadside unit 222, and a base station 224 or another suitable network access point. In various embodiments, the V2X processing device 202 may receive information from a plurality of information sources, such as the in-vehicle network 210, infotainment system 212, various sensors 214, various actuators 216, and the RF module 218. The V2X processing device 204 may detect a misbehavior condition in a system of the vehicle, such as one of the plurality of information sources 210-218, an application or service executing on the V2X processing device 204, or another system of the vehicle.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 3A:
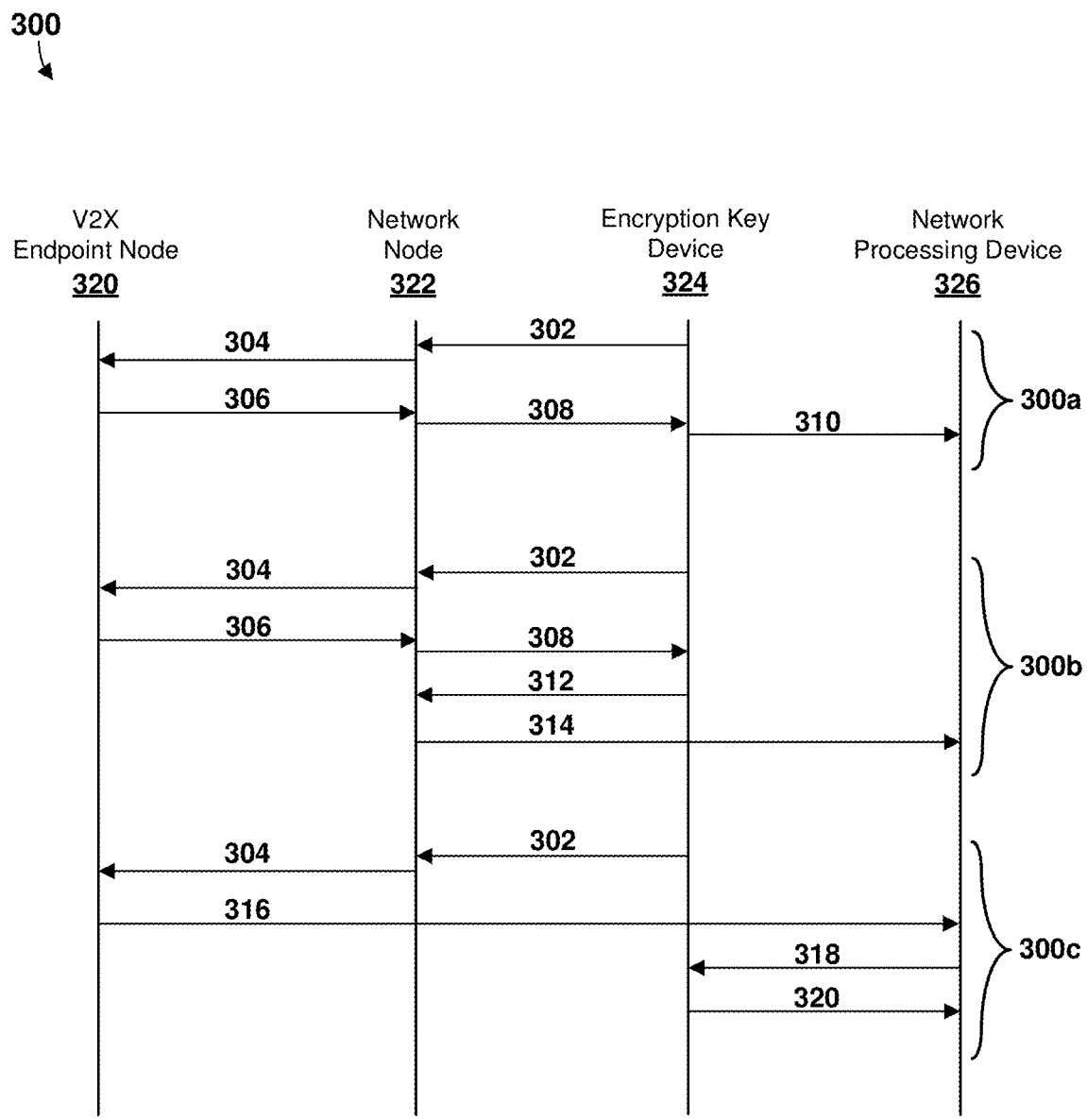
FIG. 3A is a message flow diagram illustrating examples of communications exchanged among network elements between the base station and a wireless device during the method for authenticating plaintext and ciphertext in a V2X message.

FIG. 3A is a message flow diagram 300 illustrating examples of communications exchanged among network elements between the base station and a wireless device during the method for authenticating plaintext and ciphertext in a V2X message. FIG. 3B illustrates an example data structure 350 suitable for implementing various embodiments. With reference to FIGS. 1-3B, the network elements may include a V2X endpoint node 320 (e.g., the vehicle 12, 14, 16, 202), a network node 322 (e.g., another of the vehicles 12, 14, 16, 220, the RSU 132, 220), an encryption key device 324 (e.g., the network element 134, 136), and a network processing device 326 (e.g., the network element 134, 136). In some embodiments, the encryption key device 324 may be a separate device, such as an encryption key server. In some embodiments, the encryption key device 324 may be a module, unit, or function of the network node 322 or of the network processing device 326.

In a first example scenario 300a, the encryption key device 324 may generate an encryption key and send the encryption key to the network node 322 in a message 302. In some embodiments, the encryption key may be or may include a public key. The network node 322 may send the encryption key to the V2X endpoint node 320 with a request 304 that the V2X provide certain information. The request 304 may be, or may be included in, a V2X message. In general, V2X messages are configured for use in a V2X communication system, formatted according to a V2X communication protocol, and configured for transmission via a bandwidth and/or other resource constrained wireless communication link.

The V2X endpoint node 320 may generate a response that includes a plaintext message. The V2X endpoint node may generate ciphertext from the plaintext message, and may generate a hash of the ciphertext and a hash of the plaintext message. The V2X endpoint node may generate the hash(es) using a hashing algorithm, such as any of the SHA-2 suite of algorithms and the like. The V2X endpoint node 320 may generate a digital signature of a concatenation of the hash of the ciphertext and the hash of the plaintext message. In various embodiments, hash of the ciphertext and the hash of the plaintext message may be concatenated in any order.

In some embodiments, the V2X endpoint node may generate a data structure, such as the data structure 350 (FIG. 3B), and the V2X endpoint node may generate the digital signature of the data structure. The data structure 350 may include markers identifying the hash of the ciphertext and/or the hash of the plaintext message. The data structure 350 also may include other data. For example, the data structure 350 (e.g., "SignedDecryptableData") may include a description 352 of its structure and/or contents, such as a hash of the plaintext message, or the plaintext message itself ("hOP HashOrPlaintext"), a hash of the ciphertext, or the ciphertext message itself ("hOC HashOrCiphertext"), etc. The data structure 350 also may include a description 354 of the hash of the plaintext message or the plaintext message, a description 356 of the hash of the ciphertext or the ciphertext message, as well as other data fields, descriptors, markets, and/or other content.

Returning to FIG. 3A, the V2X endpoint node may send a V2X message 306 that includes the ciphertext, the hash of the plaintext message, and the digital signature to the network node 322. The network node 322 may determine whether the V2X endpoint node 320 signed the concatenation of the hash of the ciphertext and the hash of the plaintext message by generating a hash of the ciphertext, using the generated hash of the ciphertext to construct an appropriately-encoded concatenation of the received hash of the plaintext message and the generated hash of the ciphertext, and using the concatenation of the received hash of the plaintext message and the generated hash of the ciphertext as an input to verify the digital signature using the V2X endpoint node's public key. In response to determining that the V2X endpoint node signed the concatenation of the hash of the ciphertext and the hash of the plaintext message, the network node 322 may send the ciphertext, the hash of the plaintext message, and the digital signature to the encryption key device 324 in a message 308.

The encryption key device 324 may decrypt the ciphertext to generate the plaintext message. The encryption key device 324 may then send in communication 310 the plaintext message, the hash of the ciphertext, and the digital signature (of the concatenation of the hash of the ciphertext and the hash of the plaintext message) to the network processing device 326.

In a second example scenario 300b in accordance with some embodiments, the encryption key device 324 may return the plaintext message to the network node 322 in a message 312, and the network node 322 may send the plaintext message, the hash of the ciphertext, and the digital signature (of the concatenation of the hash of the ciphertext and the hash of the plaintext message) to the network processing device 326 in a message 314. In some embodiments, the network node 322 and the encryption key device 324 may be co-located with or incorporated into the network node 322, and decryption operations may be performed near or in the network node 322

In a third example scenario 300c in accordance with some embodiments, the endpoint node may send the ciphertext, the hash of the plaintext message, and the digital signature to the network processing device 326 in a message 316. In some embodiments, the network processing device 326 may determine whether the V2X endpoint node 320 signed the concatenation of the hash of the ciphertext and the hash of the plaintext message by generating a hash of the ciphertext, using the generated hash of the ciphertext to construct an appropriately-encoded concatenation of the received hash of the plaintext message and the generated hash of the ciphertext, and using the concatenation of the received hash of the plaintext message and the generated hash of the ciphertext as an input to verify the digital signature using the V2X endpoint node's public key. In response to determining that the V2X endpoint node signed the concatenation of the hash of the ciphertext and the hash of the plaintext message, the network processing device 326 may send the ciphertext to the encryption key device 324 for decryption in a message 318. The encryption key device may decrypt the ciphertext and may send the plaintext to the network processing device in a message 320. In some embodiments, the encryption key device 324 may be co-located with or incorporated into the network processing device 326, and decryption operations may be performed near or in the network processing device 326.

The network processing device 326 may determine whether the V2X endpoint node signed the concatenation of the hash of the ciphertext and the hash of the plaintext message by generating a hash of the plaintext message, using the hash of the plaintext message to construct an appropriately-encoded concatenation of the generated hash of the plaintext message and the received hash of the ciphertext, and using the concatenation of the generated hash of the plaintext message and the received hash of the ciphertext as an input to verify the digital signature using the V2X endpoint node's public key. In response to determining that the V2X endpoint node signed the concatenation of the ciphertext and the plaintext message, the network processing device 326 may perform a data transaction for the V2X endpoint node.

In various embodiments, the V2X messages 304 and 306 may be configured according to one or more functions or systems. As two examples, the V2X messages 304 and 306 may be configured as tolling messages (e.g., for a fee collection or toll collection system) or parking access messages (e.g., for a parking payment system). The V2X messages 304 and 306 also may be configured as road condition messages (e.g., a message to another vehicle, to an RSU, or to a network node about traffic, observed vehicle behavior, road damage, a dangerous road condition such as ice or flooding, etc.). The V2X messages 304 and 306 also may be configured as geonetworking message (e.g., for use in a geonetworking message or messaging system). For example, the V2X endpoint node may send a V2X message for conveyance to a particular set of other vehicles, RSUs, etc. such as along a road or path, or in a particular direction. For example, a geonetworking message may be used to notify other vehicles of a dangerous traffic or road situation along a specific road. As another example, a geonetworking message may be used to notify other vehicles that emergency vehicles are approaching, so that the other vehicles may temporarily clear the roadway.

The V2X messages 304 and 306 also may be configured as an emergency responder message (e.g., for use by police, fire, emergency medical technician, or other emergency responder system). For example, emergency responder V2X messages may include information that is intended only for reception by other emergency responders and not by the general public, such as information about a dangerous condition, event, accident, and the like, identity information about suspects or victims, medical information (e.g., that must be treated confidentially), personal identifiable information (PII), and the like. In some implementations, the content of the plaintext message may include information of a confidential or sensitive nature, or information that must be treated confidentially by law or regulation (e.g., financial accounts information, medical information, and so forth).

Figure 4:
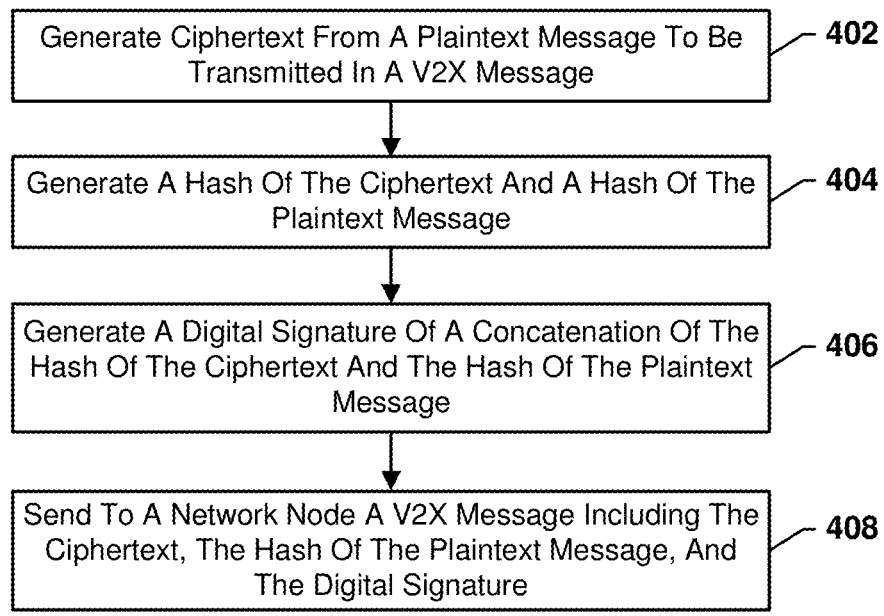
FIG. 4 is a process flow diagram illustrating a method performed by a processor of a V2X for authenticating plaintext and ciphertext in a V2X message according to various embodiments.

FIG. 4 is a process flow diagram illustrating a method 400 performed by a processor of a V2X endpoint node for authenticating plaintext and ciphertext in a V2X message according to various embodiments. With reference to FIGS. 1-4, the operations of the method 400 may be performed by a V2X processing device in a V2X endpoint node (e.g., 12, 14, 16, 202, 320).

In block 402, V2X processing device may generate ciphertext from a plaintext message to be transmitted in a V2X message. For example, the V2X processing device may generate a plaintext message, and then generate the ciphertext by encrypting the plaintext message.

In block 404, the V2X processing device may generate a hash of the ciphertext and a hash of the plaintext message. Any form of hash function or algorithm may be used in generating the two hashes, and different hash functions or algorithms may be used in generating the hash of the ciphertext and the hash of the plaintext message.

In block 406, the V2X processing device may generate a digital signature of a concatenation of the hash of the ciphertext and the hash of the plaintext message. Any form of signing function or algorithm may be used in generating the digital signature.

In block 408, the V2X processing device may send to a network node a V2X message including the ciphertext, the hash of the plaintext message, and the digital signature. In some embodiments, the ciphertext, the hash of the plaintext message, and the digital signature may be configured to enable the network node to verify that the V2X endpoint node signed the signed concatenation. In some embodiments, the V2X message may be configured for transmission over a limited bandwidth wireless communication link, such as a V2X message transmitted by one V2X endpoint node and received by another V2X endpoint node.

In some embodiments, the V2X message may be configured as a tolling message, a parking access message, a road condition message, a geonetworking message, or an emergency responder message. In some embodiments, the plaintext message may include one of tolling information, parking access information, road condition information, geonetworking information, and emergency responder information. In some embodiments, the concatenation of the hash of the ciphertext and the hash of the plaintext message may include, or be included in, a data structure that defines or specifies byte ranges or boundaries of the ciphertext and/or the hash of the ciphertext and an identification of the plaintext message and/or the hash of the plaintext message.

Figure 5:
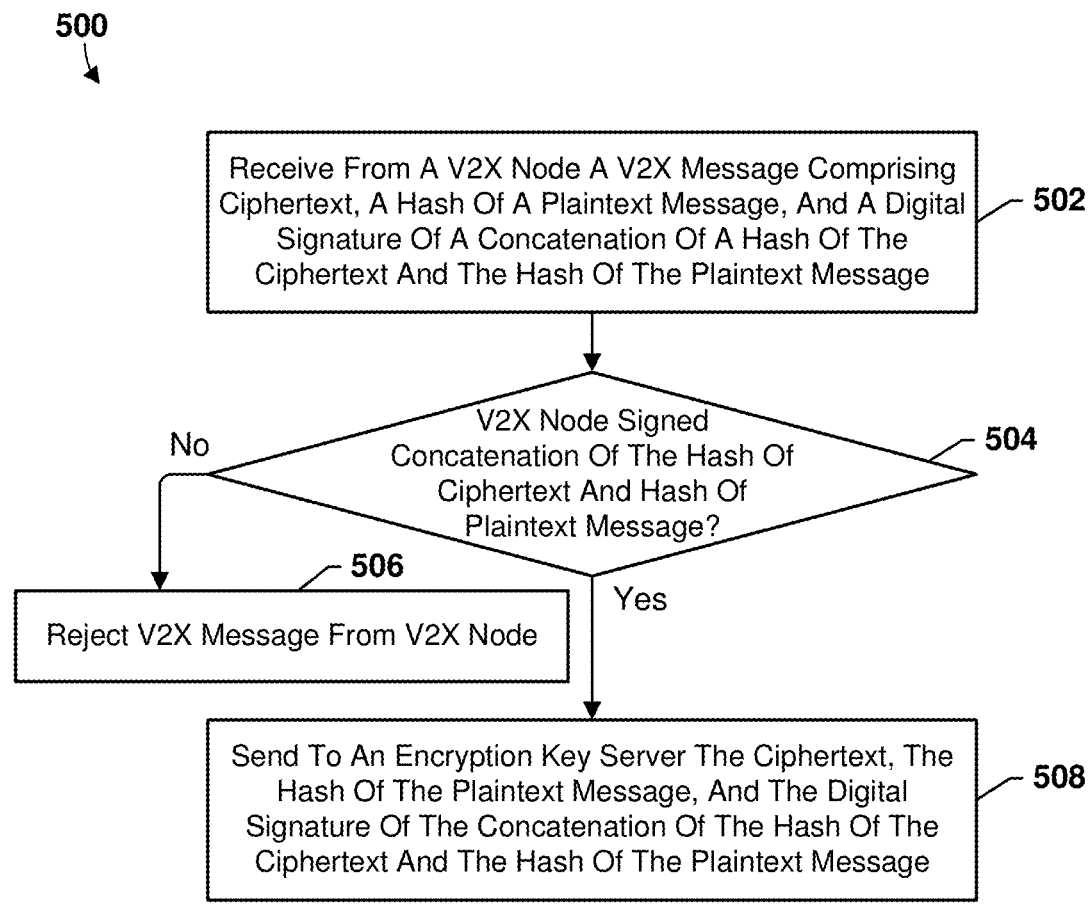
FIG. 5 is a process flow diagram illustrating a method performed by a processor of a network node for processing a V2X message according to various embodiments.

FIG. 5 is a process flow diagram illustrating a method 500 performed by a processor of a network node for processing a V2X message according to various embodiments. With reference to FIGS. 1-5, the operations of the method 500 may be performed by a processing device (which may be a V2X processing device) in a network node (e.g., 12, 14, 16, 220, 132, 220, 322).

In block 502, the processing device may receive from a V2X endpoint node (e.g., 12, 14, 16, 202, 320) a V2X message including ciphertext, a hash of a plaintext message, and a digital signature of a concatenation of a hash of the ciphertext and the hash of the plaintext message.

In determination block 504, the processing device may determine whether the V2X endpoint node signed the concatenation of the hash of the ciphertext and the hash of the plaintext message. In some embodiments, the processing device may generate a hash of the ciphertext, use the generated hash of the ciphertext to construct a concatenation of the received hash of the plaintext message and the generated hash of the ciphertext, and using the concatenation of the received hash of the plaintext message and the generated hash of the ciphertext as an input to verify the digital signature using the V2X endpoint node's public key.

In response to determining that the V2X endpoint node did not sign the concatenation of the hash of the ciphertext and the hash of the plaintext message (i.e., determination block 504="No"), the processing device may reject the V2X message from the V2X endpoint node in block 506. Rejecting the V2X message may include ignoring the V2X message, stopping further processing of the V2X message, and other suitable operations.

In response to determining that the V2X endpoint node did sign the concatenation of the hash of the ciphertext and the hash of the plaintext message (i.e., determination block 504="Yes"), the processing device may send to an encryption key device the ciphertext, the hash of the plaintext message, and the digital signature of the concatenation of the hash of the ciphertext and the hash of the plaintext message in block 508.

In some embodiments, the processing device may generate the hash of the ciphertext using a hash algorithm known to be used by an authentic V2X endpoint node. In some embodiments, the V2X message may be configured for transmission over a limited bandwidth wireless communication link. In some embodiments, the V2X message may be configured as a tolling message, a parking access message, a road condition message, a geonetworking message, or an emergency responder message. In some embodiments, the concatenation of the hash of the ciphertext and the hash of the plaintext message may include, or be included in, a data structure that includes an identification of the ciphertext and/or the hash of the ciphertext and an identification of the plaintext message and/or the hash of the plaintext message.

Figure 6:
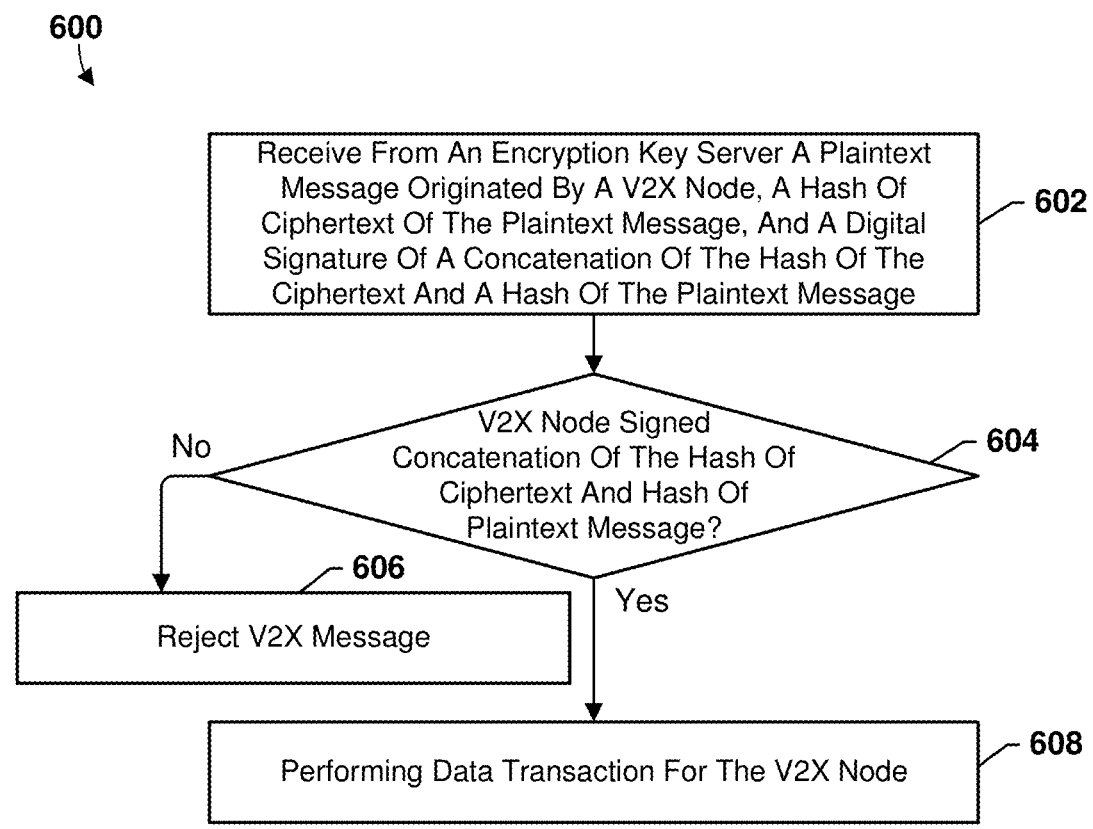
FIG. 6 is a process flow diagram illustrating a method performed by a processor of a computing device for authenticating plaintext and ciphertext in a V2X message according to various embodiments.

FIG. 6 is a process flow diagram illustrating a method 600 performed by a processor of a computing device for authenticating plaintext and ciphertext in a V2X message according to various embodiments. With reference to FIGS. 1-6, the operations of the method 600 may be performed by a processing device in a network processing device (e.g., 134, 136).

In block 602, the processing device may receive from an encryption key device (e.g., 324) a plaintext message originated by a V2X endpoint node (e.g., 12, 14, 16, 202, 320), a hash of ciphertext of the plaintext message, and a digital signature of a concatenation of the hash of the ciphertext and a hash of the plaintext message.

In determination block 604, the processing device may determine whether the V2X endpoint node signed the concatenation of the hash of the ciphertext and the hash of the plaintext message. In some embodiments, the processing device may generate a hash of the plaintext message, use the hash of the plaintext message to construct a concatenation of the generated hash of the plaintext message and the received hash of the ciphertext, and use the concatenation of the generated hash of the plaintext message and the received hash of the ciphertext as an input to verify the digital signature using the V2X endpoint node's public key. In some embodiments, the concatenation of the hash of the ciphertext and the hash of the plaintext message may include a data structure that includes an identification of the ciphertext or the hash of the ciphertext and an identification of the plaintext message or the hash of the plaintext message.

In response to determining that the V2X endpoint node did not sign the concatenation of the hash of the ciphertext and the hash of the plaintext message (i.e., determination block 604="No"), the processing device may reject the V2X message from the V2X endpoint node in block 606. Rejecting the V2X message may include ignoring the V2X message, stopping further processing of the V2X message, and other suitable operations.

In response to determining that the V2X endpoint node did sign the concatenation of the hash of the ciphertext and the hash of the plaintext message (i.e., determination block 604="Yes"), the processing device may perform a data transaction for the V2X endpoint node block 608.

Figure 7:
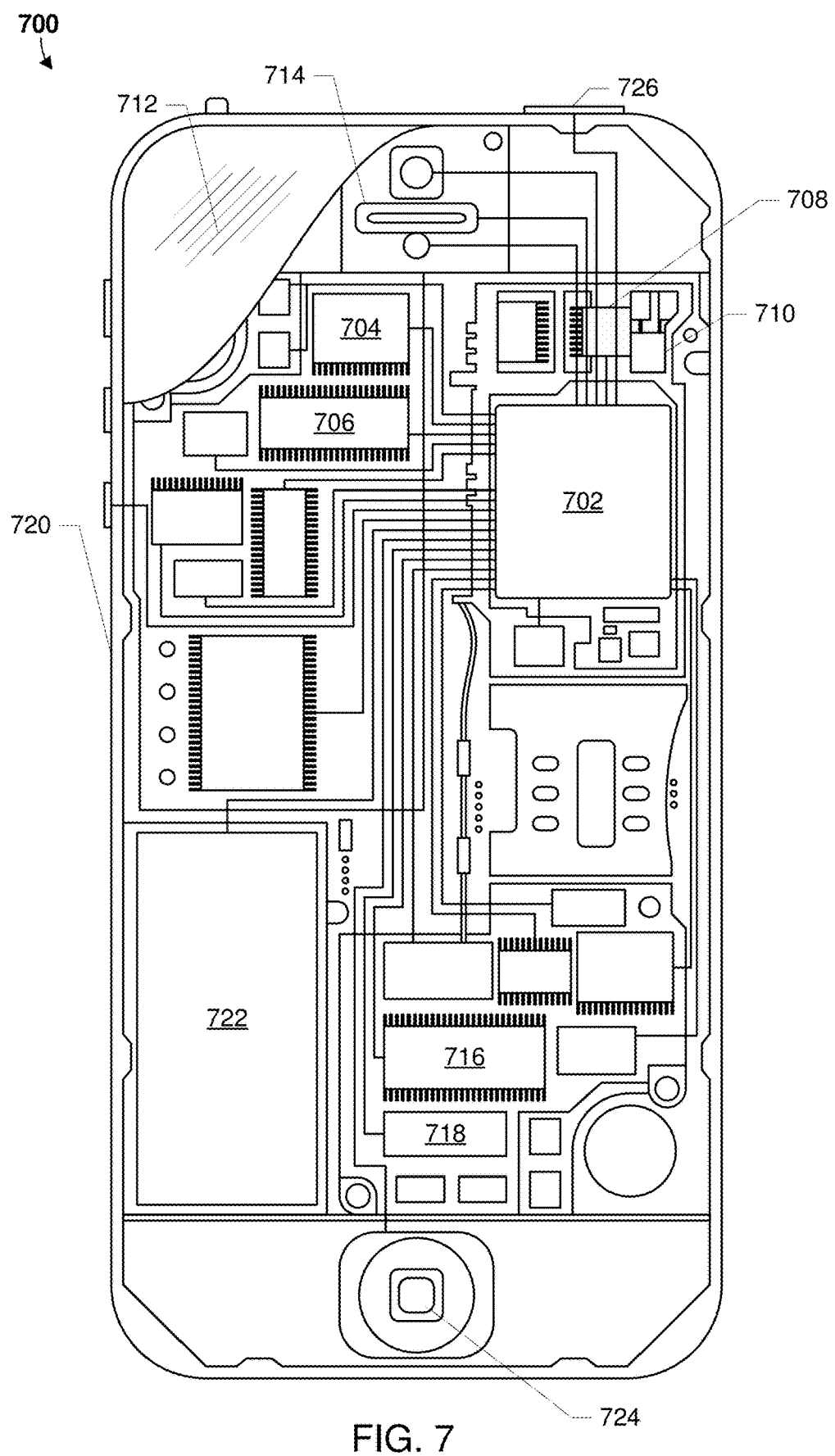
FIG. 7 is a component block diagram illustrating an example mobile computing device suitable for use with various embodiments.

FIG. 7 is a component block diagram illustrating an example mobile computing device 700 suitable for use with various embodiments. With reference to FIGS. 1-7, various embodiments may be implemented in a wide variety of computing systems including on-board equipment as well as mobile computing devices, including the example mobile computing device 700. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. One of ordinary skill in the art may recognize that the housing 720 may be a dashboard counsel of a vehicle in an on-board embodiment. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
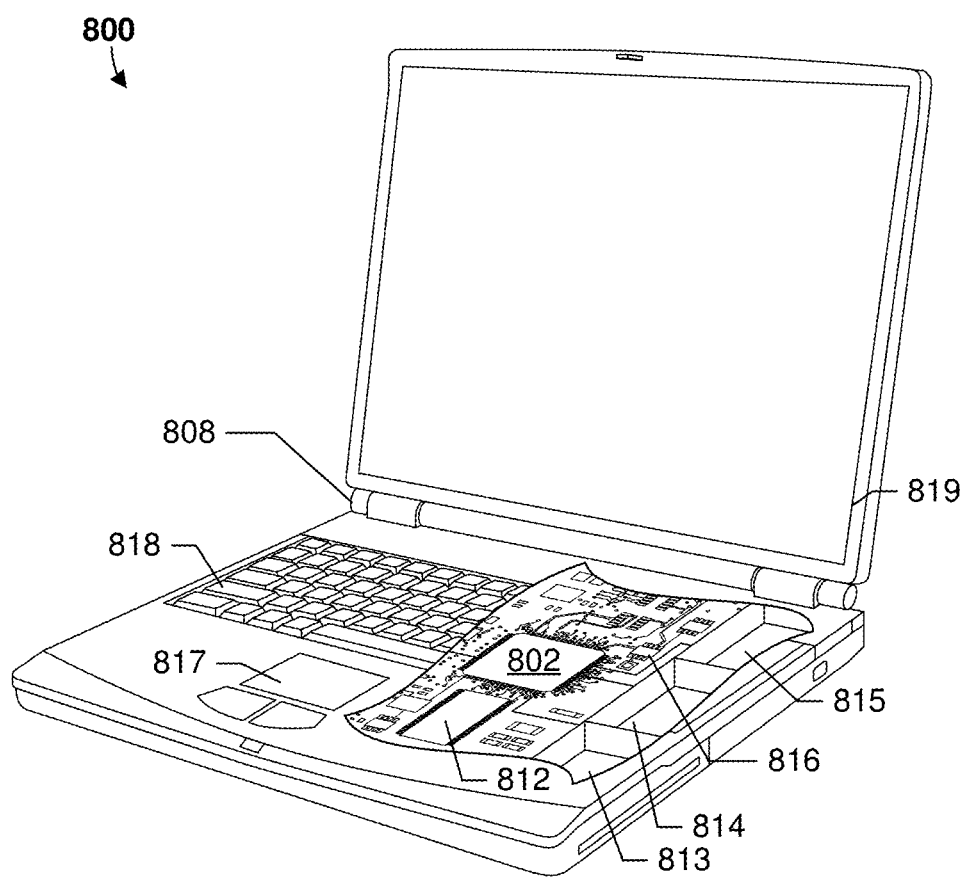
FIG. 8 is a component block diagram illustrating an example mobile computing device suitable for use with various embodiments.

FIG. 8 is a component block diagram illustrating an example mobile computing device 800 suitable for use with various embodiments. With reference to FIGS. 1-8, various embodiments may be implemented in a wide variety of computing systems including the example mobile computing device 800, which is illustrated as a laptop computer. The mobile computing device 800 may include a touchpad touch surface 817 that serves as the computer's pointing device, and thus may receive drag, scroll, and flick gestures similar to those implemented on computing devices equipped with a touch screen display and described above. A mobile computing device 800 will typically include a processor 802 coupled to volatile memory 812 and a large capacity nonvolatile memory, such as a disk drive 813 of FLASH memory. Additionally, the mobile computing device 800 may have one or more antenna 808 for sending and receiving electromagnetic radiation that may be connected to a wireless data link and/or cellular telephone transceiver 816 coupled to the processor 802. The mobile computing device 800 may also include a floppy disc drive 814 and a compact disc (CD) drive 815 coupled to the processor 802. In a notebook configuration, the computer housing includes the touchpad 817, the keyboard 818, and the display 819 all coupled to the processor 802. Other configurations of the computing device may include a computer mouse or trackball coupled to the processor (e.g., via a USB input) as are well known, which may also be used in conjunction with various embodiments.

Figure 9:
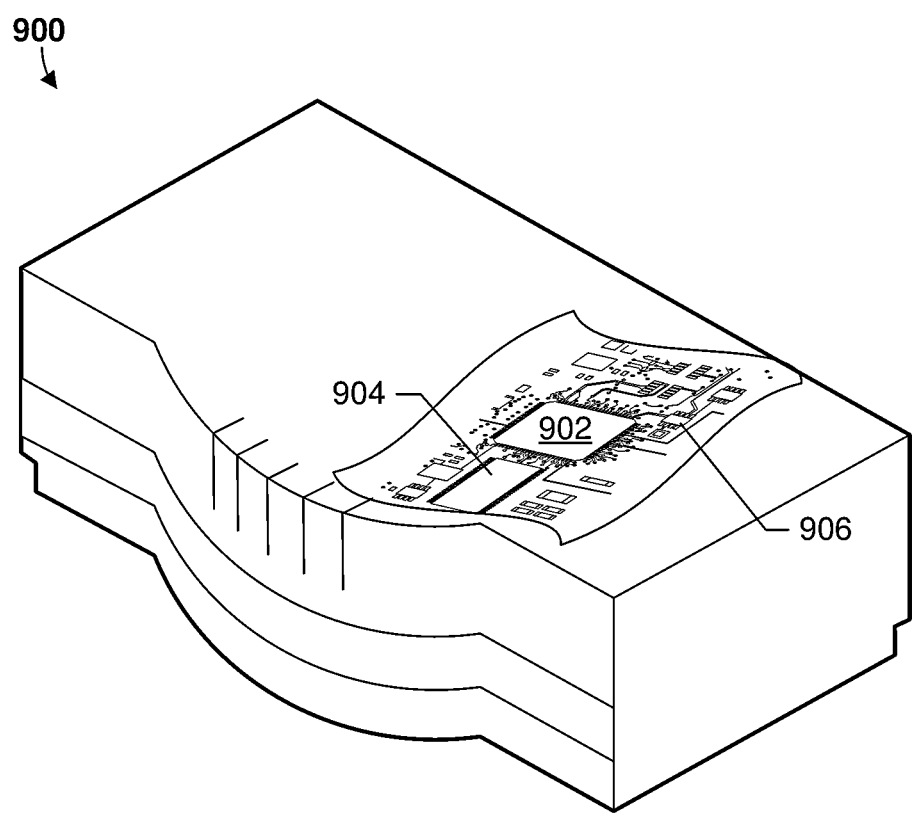
FIG. 9 is a component block diagram illustrating an example V2X onboard equipment suitable for use with various embodiments.

FIG. 9 is a component block diagram illustrating an example V2X onboard equipment 900 suitable for use with various embodiments. With reference to FIGS. 1-9, various embodiments may be implemented in a wide variety of V2X onboard equipment 900. Such V2X onboard equipment 900 may be configured to be implemented in a vehicle and connect to various vehicles systems and sensors. The V2X onboard equipment 900 may include a processor 902 coupled to memory 904. The memory 904 may be any form of non-transitory media (e.g., read only memory (ROM), FLASH memory, etc.) and may store data and processor-executable instructions configured to cause the processor 902 to perform operations of any of the embodiment methods described herein. The processor 902 may also be coupled to a wireless transceiver 906 that is coupled to an antenna of the vehicle (not shown) and configured to transmit and receive V2X messages.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, and 600 may be substituted for or combined with one or more operations of the methods 400, 500, and 600.

Implementation examples are described in the following paragraphs. While some of the following implementation examples are described in terms of example methods, further example implementations may include: the example methods discussed in the following paragraphs implemented by a V2X processing device that may be an on-board unit, mobile device unit, mobile computing unit, or stationary roadside unit), a network node, or a computing device, including a processor configured with processor-executable instructions to perform operations of the methods of the following implementation examples; the example methods discussed in the following paragraphs implemented by a V2X processing device, a network node processing device, or a network computing node processing device including means for performing functions of the methods of the following implementation examples; and the example methods discussed in the following paragraphs may be implemented as a non-transitory processor-readable storage medium having stored thereon processor-executable instructions configured to cause a processor of a V2X processing device, a network node processing device, or a network computing node processing device to perform the operations of the methods of the following implementation examples.

Example 1. A method performed by a processor of an endpoint node for authenticating plaintext and ciphertext in a message, including generating ciphertext from a plaintext message to be transmitted in a message; generating a hash of the ciphertext and a hash of the plaintext message; generating a digital signature of a concatenation of the hash of the ciphertext and the hash of the plaintext message; and sending to a network node a message including the ciphertext, the hash of the plaintext message, and the digital signature, in which the ciphertext, the hash of the plaintext message, and the digital signature are configured to enable the network node to verify that the endpoint node signed the signed concatenation.

Example 2. The method of example 1, in which the endpoint node includes a vehicle-to-everything (V2X) endpoint node, and the message includes a V2X message.

Example 3. The method of any of examples 1 and 2, in which the message is configured for transmission over a limited bandwidth wireless communication link.

Example 4. The method of any of examples 1-3, in which the message is configured as one of a tolling message, a parking access message, a road condition message, a geonetworking message, or an emergency responder message.

Example 5. The method of any of examples 1-4, in which the plaintext message includes one of tolling information, parking access information, road condition information, geonetworking information, and emergency responder information.

Example 6. The method of any of examples 1-5, in which the concatenation of the hash of the ciphertext and the hash of the plaintext message includes a data structure that includes an identification of the ciphertext or the hash of the ciphertext and an identification of the plaintext message or the hash of the plaintext message.

Example 7. A method performed by a processor of a network node for processing a message, including receiving from an endpoint node a message including ciphertext, a hash of a plaintext message, and a digital signature of a concatenation of a hash of the ciphertext and the hash of the plaintext message; determining whether the endpoint node signed the concatenation of the hash of the ciphertext and the hash of the plaintext message; and sending to an encryption key device the ciphertext, the hash of the plaintext message, and the digital signature of the concatenation of the hash of the ciphertext and the hash of the plaintext message in response to determining that the endpoint node signed the concatenation of the hash of the ciphertext and the hash of the plaintext message.

Example 8. The method of example 7, in which the message includes a vehicle-to-everything (V2X) message and the endpoint node includes a V2X endpoint node.

Example 9. The method of any of examples 7 and 8, in which determining whether the endpoint node signed the concatenation of the hash of the ciphertext and the hash of the plaintext message includes: generating a hash of the ciphertext; concatenating the hash of the plaintext message and the generated hash of the ciphertext; and providing the concatenation of the hash of the plaintext message and the generated hash of the ciphertext as an input to verify the digital signature using a public key of the endpoint node.

Example 10. The method of any of examples 7-9, in which generating the hash of the ciphertext includes generating the hash of the ciphertext using a hash algorithm known to be used by an authentic endpoint node.

Example 11. The method of any of examples 7-10, in which the message is configured for transmission over a limited bandwidth wireless communication link.

Example 12. The method of any of examples 7-11, in which the message is configured as one of a tolling message, a parking access message, a road condition message, a geonetworking message, or an emergency responder message.

Example 13. The method of any of examples 7-12, in which the concatenation of the hash of the ciphertext and the hash of the plaintext message includes a data structure that includes an identification of the ciphertext or the hash of the ciphertext and an identification of the plaintext message or the hash of the plaintext message.

Example 14. The method of any of examples 7-13, in which sending to an encryption key device the ciphertext, the hash of the plaintext message, and the digital signature of the concatenation of the hash of the ciphertext and the hash of the plaintext message includes sending to an encryption key server the ciphertext, the hash of the plaintext message, and the digital signature of the concatenation of the hash of the ciphertext and the hash of the plaintext message.

Example 15. The method of any of examples 7-14, in which sending to an encryption key device the ciphertext, the hash of the plaintext message, and the digital signature of the concatenation of the hash of the ciphertext and the hash of the plaintext message includes sending to an encryption key module the ciphertext, the hash of the plaintext message, and the digital signature of the concatenation of the hash of the ciphertext and the hash of the plaintext message.

Example 16. A method performed by a processor of a computing device for authenticating plaintext and ciphertext in a message, including: receiving from an encryption key device a plaintext message originated by an endpoint node, a hash of ciphertext of the plaintext message, and a digital signature of a concatenation of the hash of the ciphertext and a hash of the plaintext message; determining whether the endpoint node signed the concatenation of the hash of the ciphertext and a hash of the plaintext message; and performing a data transaction for the endpoint node in response to determining that the endpoint node signed the concatenation of the ciphertext and the plaintext message.

Example 17. The method of example 16, in which the message includes a vehicle-to-everything (V2X) message and the endpoint node includes a V2X endpoint node.

Example 18. The method of any of examples 16 and 17, in which determining whether the endpoint node signed the concatenation of the hash of the ciphertext and a hash of the plaintext message includes: generating a hash of the plaintext message; concatenating the generated hash of the plaintext message and the hash of the ciphertext; and providing the concatenation of the generated hash of the plaintext message and the hash of the ciphertext as an input to verify the digital signature using a public key of the endpoint node.

Example 19. The method of any of examples 16-18, in which the plaintext message includes one of tolling information, parking access information, road condition information, geonetworking information, and emergency responder information.

Example 20. The method of any of examples 16-19, in which the concatenation of the hash of the ciphertext and the hash of the plaintext message includes a data structure that includes an identification of ciphertext or the hash of the ciphertext and an identification of the plaintext message or the hash of the plaintext message.

Example 21. The method of any of examples 16-20, in which receiving from an encryption key device a plaintext message originated by an endpoint node, a hash of ciphertext of the plaintext message, and a digital signature of a concatenation of the hash of the ciphertext and a hash of the plaintext message includes receiving from an encryption key server the plaintext message originated by the endpoint node, a hash of ciphertext of the plaintext message, and a digital signature of a concatenation of the hash of the ciphertext and a hash of the plaintext message.

Example 22. The method of any of examples 16-21, in which receiving from an encryption key device a plaintext message originated by an endpoint node, a hash of ciphertext of the plaintext message, and a digital signature of a concatenation of the hash of the ciphertext and a hash of the plaintext message includes receiving from an encryption key module the plaintext message originated by the endpoint node, a hash of ciphertext of the plaintext message, and a digital signature of a concatenation of the hash of the ciphertext and a hash of the plaintext message.

Example 23. A system for authenticating plaintext and ciphertext in a message, including: an endpoint node including a processor configured with processor-executable instructions to generate ciphertext from a plaintext message to be transmitted in a message; generate a hash of the ciphertext and a hash of the plaintext message; generate a digital signature of a concatenation of the hash of the ciphertext and the hash of the plaintext message; and send a message including the ciphertext, the hash of the plaintext message, and the digital signature; a network node including a processor configured with processor-executable instructions to receive from the endpoint node the message including the ciphertext, the hash of a plaintext message, and the digital signature; determine whether the endpoint node signed the concatenation of the hash of the ciphertext and the hash of the plaintext message; and send to an encryption key device the ciphertext, the hash of the plaintext message, and the digital signature in response to determining that the endpoint node signed the concatenation of the hash of the ciphertext and the hash of the plaintext message; and a network processing device including a processor configured with processor-executable instructions to receive from an encryption key device the plaintext message originated by the endpoint node, a hash of ciphertext of the plaintext message, and a digital signature of a concatenation of the hash of the ciphertext and a hash of the plaintext message; determine whether the endpoint node signed the concatenation of the hash of the ciphertext and the hash of the plaintext message; and perform a data transaction for the endpoint node in response to determining that the endpoint node signed the concatenation of the ciphertext and the plaintext message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of an endpoint node for authenticating plaintext and ciphertext in a message, comprising:
   generating ciphertext from a plaintext message to be transmitted in a message;
   generating a hash of the ciphertext and a hash of the plaintext message;
   generating a digital signature of a concatenation of the hash of the ciphertext and the hash of the plaintext message; and
   sending to a network node a message comprising the ciphertext, the hash of the plaintext message, and the digital signature,
   wherein the ciphertext, the hash of the plaintext message, and the digital signature are configured to enable the network node to verify that the endpoint node signed the signed concatenation;
   wherein at least one of the message and plaintext message is configured as one of a tolling message, a parking access message, a geonetworking message, or an emergency responder message.

2. The method of claim 1, wherein the endpoint node comprises a vehicle-to-everything (V2X) endpoint node, and the message comprises a V2X message.

3. The method of claim 1, wherein the concatenation of the hash of the ciphertext and the hash of the plaintext message comprises a data structure that includes an identification of the ciphertext or the hash of the ciphertext and an identification of the plaintext message or the hash of the plaintext message.

4. An endpoint node, comprising:
   a processor configured with processor-executable instructions to:
   generate ciphertext from a plaintext message to be transmitted in a message;
   generate a hash of the ciphertext and a hash of the plaintext message;
   generate a digital signature of a concatenation of the hash of the ciphertext and the hash of the plaintext message; and
   send to a network node a message comprising the ciphertext, the hash of the plaintext message, and the digital signature;
   wherein the ciphertext, the hash of the plaintext message, and the digital signature are configured to enable the network node to verify that the endpoint node signed the signed concatenation;
   wherein at least one of the message and plaintext message is configured as one of a tolling message, a parking access message, a geonetworking message, or an emergency responder message.

5. The endpoint node of claim 4, wherein the endpoint node comprises a vehicle-to-everything (V2X) endpoint node, and the message comprises a V2X message.

6. The endpoint node of claim 4, wherein the concatenation of the hash of the ciphertext and the hash of the plaintext message comprises a data structure that includes an identification of the ciphertext or the hash of the ciphertext and an identification of the plaintext message or the hash of the plaintext message.

7. A method performed by a processor of a network node for processing a message, comprising:
   receiving from an endpoint node a message comprising ciphertext, a hash of a plaintext message, and a digital signature of a concatenation of a hash of the ciphertext and the hash of the plaintext message;
   determining whether the endpoint node signed the concatenation of the hash of the ciphertext and the hash of the plaintext message; and
   sending to an encryption key device the ciphertext, the hash of the plaintext message, and the digital signature of the concatenation of the hash of the ciphertext and the hash of the plaintext message in response to determining that the endpoint node signed the concatenation of the hash of the ciphertext and the hash of the plaintext message;
wherein at least one of the message and plaintext message is configured as one of a tolling message, a parking access message, a geonetworking message, or an emergency responder message.

8. The method of claim 7, wherein the message comprises a vehicle-to-everything (V2X) message and the endpoint node comprises a V2X endpoint node.

9. The method of claim 7, wherein determining whether the endpoint node signed the concatenation of the hash of the ciphertext and the hash of the plaintext message comprises:
generating a hash of the ciphertext;
concatenating the hash of the plaintext message and the generated hash of the ciphertext; and
providing the concatenation of the hash of the plaintext message and the generated hash of the ciphertext as an input to verify the digital signature using a public key of the endpoint node.

10. The method of claim 7, wherein generating the hash of the ciphertext comprises generating the hash of the ciphertext using a hash algorithm known to be used by an authentic endpoint node.

11. The method of claim 7, wherein the concatenation of the hash of the ciphertext and the hash of the plaintext message comprises a data structure that includes an identification of the ciphertext or the hash of the ciphertext and an identification of the plaintext message or the hash of the plaintext message.

12. The method of claim 7, wherein sending to an encryption key device the ciphertext, the hash of the plaintext message, and the digital signature of the concatenation of the hash of the ciphertext and the hash of the plaintext message comprises sending to an encryption key server the ciphertext, the hash of the plaintext message, and the digital signature of the concatenation of the hash of the ciphertext and the hash of the plaintext message.

13. The method of claim 7, wherein sending to an encryption key device the ciphertext, the hash of the plaintext message, and the digital signature of the concatenation of the hash of the ciphertext and the hash of the plaintext message comprises sending to an encryption key module the ciphertext, the hash of the plaintext message, and the digital signature of the concatenation of the hash of the ciphertext and the hash of the plaintext message.

14. A network node, comprising:
a processor configured with processor-executable instructions to:
receive from an endpoint node a message comprising ciphertext, a hash of a plaintext message, and a digital signature of a concatenation of a hash of the ciphertext and the hash of the plaintext message;
determine whether the endpoint node signed the concatenation of the hash of the ciphertext and the hash of the plaintext message; and
send to an encryption key device the ciphertext, the hash of the plaintext message, and the digital signature of the concatenation of the hash of the ciphertext and the hash of the plaintext message in response to determining that the endpoint node signed the concatenation of the hash of the ciphertext and the hash of the plaintext message;
wherein at least one of the message and plaintext message is configured as one of a tolling message, a parking access message, a geonetworking message, or an emergency responder message.

15. The network node of claim 14, wherein the message comprises a vehicle-to-everything (V2X) message and the endpoint node comprises a V2X endpoint node.

16. The network node of claim 14, wherein the processor is further configured with processor-executable instructions to:
generate a hash of the ciphertext;
concatenate the hash of the plaintext message and the generated hash of the ciphertext; and
provide the concatenation of the hash of the plaintext message and the generated hash of the ciphertext as an input to verify the digital signature using a public key of the endpoint node.

17. The network node of claim 14, wherein the processor is further configured with processor-executable instructions to generate the hash of the ciphertext using a hash algorithm known to be used by an authentic endpoint node.

18. The network node of claim 14, wherein the concatenation of the hash of the ciphertext and the hash of the plaintext message comprises a data structure that includes an identification of the ciphertext or the hash of the ciphertext and an identification of the plaintext message or the hash of the plaintext message.

19. The network node of claim 14, wherein the processor is further configured with processor-executable instructions to send to an encryption key server the ciphertext, the hash of the plaintext message, and the digital signature of the concatenation of the hash of the ciphertext and the hash of the plaintext message.

20. The network node of claim 14, wherein the processor is further configured with processor-executable instructions to send to an encryption key module the ciphertext, the hash of the plaintext message, and the digital signature of the concatenation of the hash of the ciphertext and the hash of the plaintext message.

21. A method performed by a processor of a computing device for authenticating plaintext and ciphertext in a message, comprising:
receiving from an encryption key device a plaintext message originated by an endpoint node, a hash of ciphertext of the plaintext message, and a digital signature of a concatenation of the hash of the ciphertext and a hash of the plaintext message;
determining whether the endpoint node signed the concatenation of the hash of the ciphertext and a hash of the plaintext message; and
performing a data transaction for the endpoint node in response to determining that the endpoint node signed the concatenation of the ciphertext and the plaintext message;
wherein at least one of the message and plaintext message is configured as one of a tolling message, a parking access message, a geonetworking message, or an emergency responder message.

22. The method of claim 21, wherein the message comprises a vehicle-to-everything (V2X) message and the endpoint node comprises a V2X endpoint node.

23. The method of claim 21, wherein determining whether the endpoint node signed the concatenation of the hash of the ciphertext and a hash of the plaintext message comprises:
generating a hash of the plaintext message;
concatenating the generated hash of the plaintext message and the hash of the ciphertext; and providing the concatenation of the generated hash of the plaintext message and the hash of the ciphertext as an input to verify the digital signature using a public key of the endpoint node.

24. The method of claim 21, wherein the concatenation of the hash of the ciphertext and the hash of the plaintext message comprises a data structure that includes an identification of the ciphertext or the hash of the ciphertext and an identification of the plaintext message or the hash of the plaintext message.

25. The method of claim 21, wherein receiving from an encryption key device a plaintext message originated by an endpoint node, a hash of ciphertext of the plaintext message, and a digital signature of a concatenation of the hash of the ciphertext and a hash of the plaintext message comprises receiving from an encryption key server the plaintext message originated by the endpoint node, a hash of ciphertext of the plaintext message, and a digital signature of a concatenation of the hash of the ciphertext and a hash of the plaintext message.

26. The method of claim 21, wherein receiving from an encryption key device a plaintext message originated by an endpoint node, a hash of ciphertext of the plaintext message, and a digital signature of a concatenation of the hash of the ciphertext and a hash of the plaintext message comprises receiving from an encryption key module the plaintext message originated by the endpoint node, a hash of ciphertext of the plaintext message, and a digital signature of a concatenation of the hash of the ciphertext and a hash of the plaintext message.

* * * * *